United States Patent [19]
Murphy

[11] Patent Number: 5,297,509
[45] Date of Patent: Mar. 29, 1994

[54] ROCKER ARM ASSEMBLY

[75] Inventor: Richard F. Murphy, Torrington, Conn.

[73] Assignee: The Torrington Company, Torrington, Conn.

[21] Appl. No.: 85,572

[22] Filed: Jun. 30, 1993

[51] Int. Cl.⁵ .............................................. F01L 1/18
[52] U.S. Cl. ............................. 123/90.39; 123/90.41; 74/519; 74/559; 384/560; 384/569; 384/906
[58] Field of Search ............... 123/90.39, 90.41, 90.42; 74/519, 559; 384/560, 569, 906

[56] References Cited

U.S. PATENT DOCUMENTS

| Re. 33,870 | 4/1992 | Fittro et al. | 123/90.41 |
|---|---|---|---|
| 3,251,350 | 5/1966 | Thompson | 123/90.41 |
| 3,466,073 | 9/1969 | Pohle | 123/90.39 |
| 3,621,823 | 11/1971 | Lombardi | 123/90.42 |
| 4,314,732 | 2/1982 | Murphy | 123/90.41 |
| 4,577,911 | 3/1986 | Fredericksen et al. | 308/2 R |
| 4,674,453 | 6/1987 | Dove, Jr. | 123/90.39 |
| 4,697,473 | 10/1987 | Patel | 123/90.39 |
| 4,718,379 | 1/1988 | Clark | 123/90.39 |
| 4,724,802 | 2/1988 | Ishii | 123/90.39 |
| 4,727,832 | 3/1988 | Miyamura et al. | 123/90.39 |
| 4,858,575 | 8/1989 | Fittro et al. | 123/90.41 |
| 4,878,463 | 11/1989 | Fredericksen et al. | 123/90.41 |
| 4,896,635 | 1/1990 | Willermet et al. | 123/90.41 |
| 4,944,257 | 7/1990 | Mills | 123/90.39 |
| 4,967,705 | 11/1990 | Maciag et al. | 123/90.48 |
| 4,993,849 | 2/1991 | Radinger | 384/560 |
| 5,063,889 | 11/1991 | Pryba et al. | 123/90.39 |
| 5,074,261 | 12/1991 | Hamburg et al. | 123/90.39 |
| 5,154,517 | 10/1992 | Hodge | 384/569 |
| 5,159,852 | 11/1992 | Harimoto | 123/90.39 |
| 5,190,000 | 3/1993 | van Schaik et al. | 123/90.39 |
| 5,195,475 | 3/1993 | Murphy et al. | 123/90.39 |

Primary Examiner—E. Rollins Cross
Assistant Examiner—Weilun Lo
Attorney, Agent, or Firm—John C. Bigler

[57] ABSTRACT

Two bearing cups are rigidly mounted on side portions of a rocker arm and extend over respective arms of a bearing support member. Rolling members within an annulus formed between the bearing cups and the bearing support member permit the rocker arm to oscillate rotatably with respect to the bearing support member. Each bearing cup has a stepped bottom surface with a first bottom portion engageable with ends of the rolling members to limit axial movement of the rolling members and a second bottom portion, offset axially with respect to the first bottom portion, engageable with stop surfaces to limit axial movement of the rocker arm with respect to the support member. A bearing assembly for mounting within a rocker arm is also disclosed.

21 Claims, 2 Drawing Sheets

ROCKER ARM ASSEMBLY

BACKGROUND OF THE INVENTION

This invention relates generally to valve operating mechanisms for use in internal combustion engines and, more particularly, to an oscillating rocker arm assembly and subassembly having rolling members.

Typically, a rocker arm assembly with rolling members is supported on a support shaft mounted perpendicularly on a support stud extending from the head of the engine. The rocker arm is pivoted on the support shaft, which serves as an inner raceway, by means of drawn cup needle roller bearings mounted on the rocker arm. Alternatively, a bearing sleeve may be mounted on the support shaft to provide the inner raceway, permitting use of a non-cylindrical support arm and facilitating the use of powder metal forming.

In some applications of such rocker arm assemblies, there is a need to provide greater axial stability of the rolling members, that is, to limit movement of the rolling members to eliminate overhang of the rolling members with respect to the raceway and to provide support along the full roller length. Also, in some applications there may be a desire to limit axial movement of the rocker arm with respect to the support shaft without requiring contact of the roller ends with a flange of the bearing sleeve or similar stop surface.

The foregoing illustrates limitations known to exist in present rocker arm bearing assemblies. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a rocker arm assembly including a rocker arm and a bearing support member adapted for mounting about a stud means. Two bearing cups are rigidly mounted on side portions of the rocker arm and extend over part of an arm of the bearing support member. Rolling members within an annulus formed between the bearing cups and the bearing support member permit the rocker arm to oscillate rotatably with respect to the bearing support member. Each bearing cup has a stepped bottom surface with a first bottom portion engageable with ends of the rolling members to limit axial movement of the rolling members and a second bottom portion, offset axially with respect to the first bottom portion, engageable with stop surfaces to limit axial movement of the rocker arm with respect to the support member.

In another aspect of the present invention, this is accomplished by providing a bearing assembly for mounting within a rocker arm.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
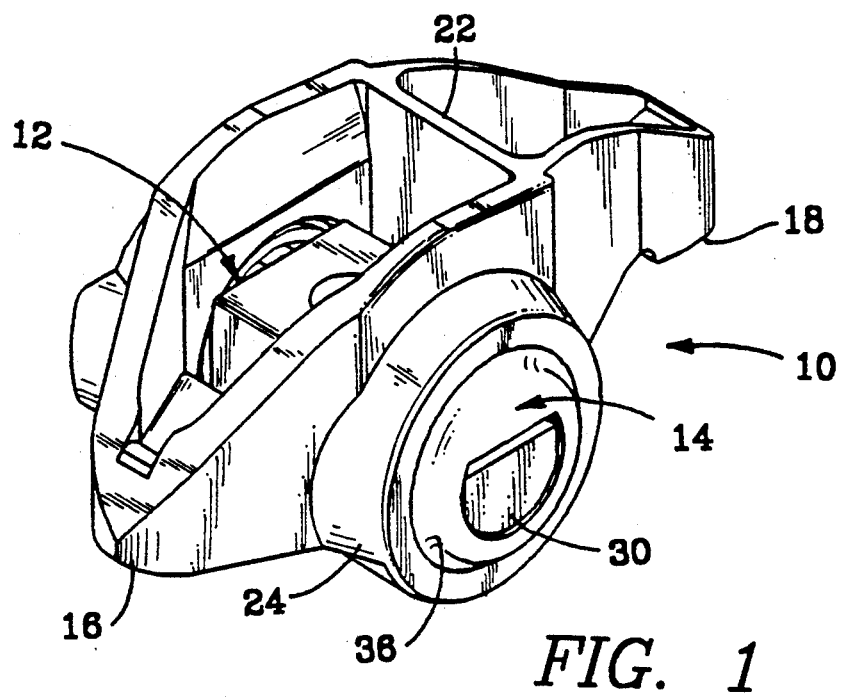
FIG. 1 is a pictorial view illustrating an embodiment of the rocker arm assembly of the present invention.

Referring now to the drawings, FIG. 1 illustrates an embodiment of the present invention having rocker arm 10 supported on bearing support member 12 by roller bearings 14 to form a rocker arm assembly as would be used in an internal combustion engine.

Rocker arm 10 has first end 16 for engagement with a push rod, not shown, and second end 18 for engagement with a valve stem of a poppet valve, not shown. The rocker arm assembly is mounted on the engine by a stud, cap screw or other stud means 20, indicated in phantom in FIG. 2. In the embodiment shown, rocker arm 10 is of a cast configuration including reinforcing web 22 and flanges 24, providing added rigidity. However, the rocker arm assembly of the present invention may be employed with stamped or cast rocker arms of various configurations.

Figure 2:
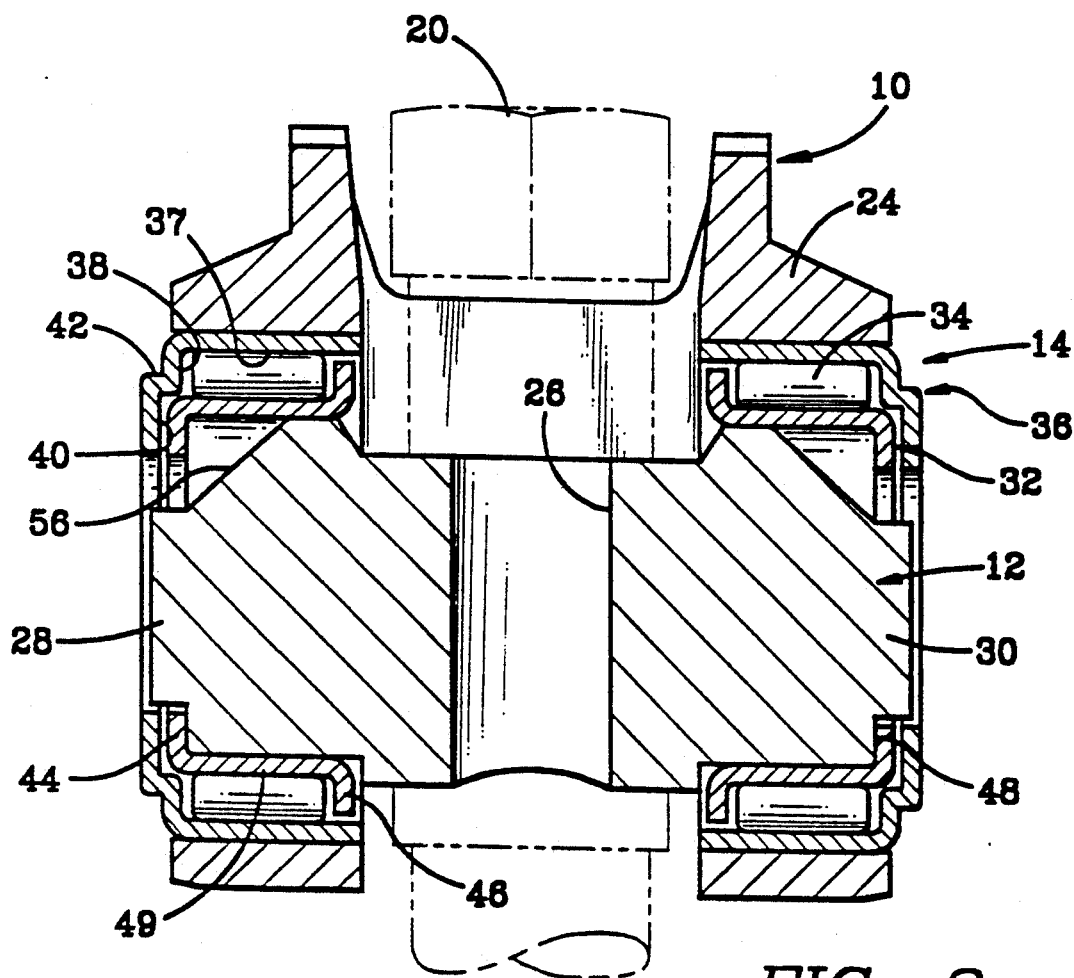
FIG. 2 is an enlarged cross sectional view of the rocker arm assembly of FIG. 1.

As illustrated in FIG. 2, bearing support member 12 has a substantially vertical bore 26 for receiving stud means 20 to mount the rocker arm assembly. Bearing support member 12 has support arms 28 and 30 which extend in opposite directions along a common axis perpendicular to stud means 20. Roller bearings 14 are mounted along that axis over support arms 28 and 30 by inner bearing sleeves 32 which provide inner raceways for rolling members 34. Roller bearings 14 may employ a full complement of needle rollers, as illustrated, or may employ other types of rolling members 34, with or without retainers.

Rolling members 34 are within an annulus formed between inner sleeves 32 and bearing cups 36. Bearing cups 36 have a common axis and are rigidly mounted on two spaced apart side portions of rocker arm 10 by any of various fixing means. In the embodiment shown, for example, apertures in the side portions provide an interference fit with bearing cups 36. Support member 12 has a cross-section smaller than the apertures in the side portions of rocker arm 10, thus allowing support member 12 to be inserted through one of the apertures during assembly.

Bearing cups 36 are of the "open" type. That is, the bearing cups have a bottom surface, cylindrical side surfaces 37, and an open top. The bottom surface is "stepped", that is, a radially inwardly extending first portion 38 and a radially inwardly extending second portion 40 axially offset from first portion 38. First portion 38 is engageable with ends of rolling members 34 to limit outward axial movement of the rolling members, and second portion 40 is engageable with a stop surface (described below) to limit axial movement of rocker ar 10 with respect to support member 12.

In the illustrated embodiment, bearing cups 36 are formed by a convenient draw process such that first portion 38 and second portion 40 are radial surfaces, i.e., perpendicular to the axis of bearing cups 36, and are connected by cylindrical portion 42. However, other configurations of the stepped bottom surface of bearing cups 36 are anticipated by the present invention. For example, portions 38 and 40 may be curved or angled with respect to the axis of roller bearings 14 and may be connected by a conical or curved portion providing the desired axial offset of bottom portions 38 and 40.

Bearing sleeves 32 are formed with radially outwardly extending flanges 46 that are engageable with ends of rolling members 34 to limit axial movement toward stud means 20. Radially inwardly extending flanges 44 abut recessed end surfaces 48 of support arms 28 and 30 to ensure proper axial location of outwardly extending flanges 46. Cylindrical portion 49 of bearing sleeves 32 provides an inner race for rolling members 34 and facilitates use of powder metal forming of support member 12 by allowing support arms 28 and 30 to have a noncylindrical configuration, as described below.

In the illustrated embodiment, inwardly extending flanges 44 provide the stop surfaces (described above) engaged by bearing cup second portion 40 to limit axial movement of rocker arm 10 with respect to support member 12. However, bearing cup portions 40 may engage end surfaces of support arms 28 and 30 directly, with similar effect. Bearing sleeves 32 are considered optional in practicing the present invention. That is, many of the advantages of the present invention may be realized without bearing sleeves 32.

The configuration of bearing sleeves 32 with both inwardly and outwardly extending flanges eliminates a bottom coining station in the sleeve tooling compared to the tooling required for forming more traditional bearing sleeves with a single flange. Similarly, problems involving sleeve bulging on a coined single lip sleeve during forming are eliminated. As a result, the illustrated bearing sleeves are significantly easier and less expensive to manufacture than traditional bearing sleeves.

Figure 3:
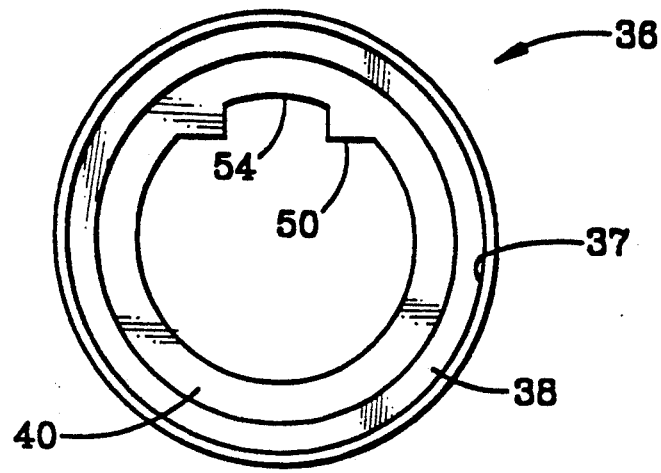
FIG. 3 is an end view of the bearing cup of the rocker arm assembly of FIG. 1.

As shown in FIGS. 1 and 3, second portion 40 of bearing cups 36 may have a modified D-shaped opening or other keyway means 50 for receiving D-shaped end or other key means 52 of support member 12. Keyway means 50 is sufficiently large with respect to key means 52 to allow rocker arm 10 to oscillate rotatably with respect to bearing support member 12. A similar configuration is described in U.S. Pat. No. 5,195,475, of which the Applicant is a coinventor.

The purpose of keyway means 50 and key means 52 is to ensure that the bearing support member 28 is assembled into rocker arm 10 with the proper orientation, that is, that bearing support member 12 is not inadvertently "upside down". During assembly, bearing support member 12 with bearings 14 can be conveniently inserted into rocker arm 10 by a machine that uniformly positions keyway means 50 with respect to rocker arm 12. Notch 54 does not engage key means 52 but may be included for convenience of manufacture or assembly.

Figure 4:
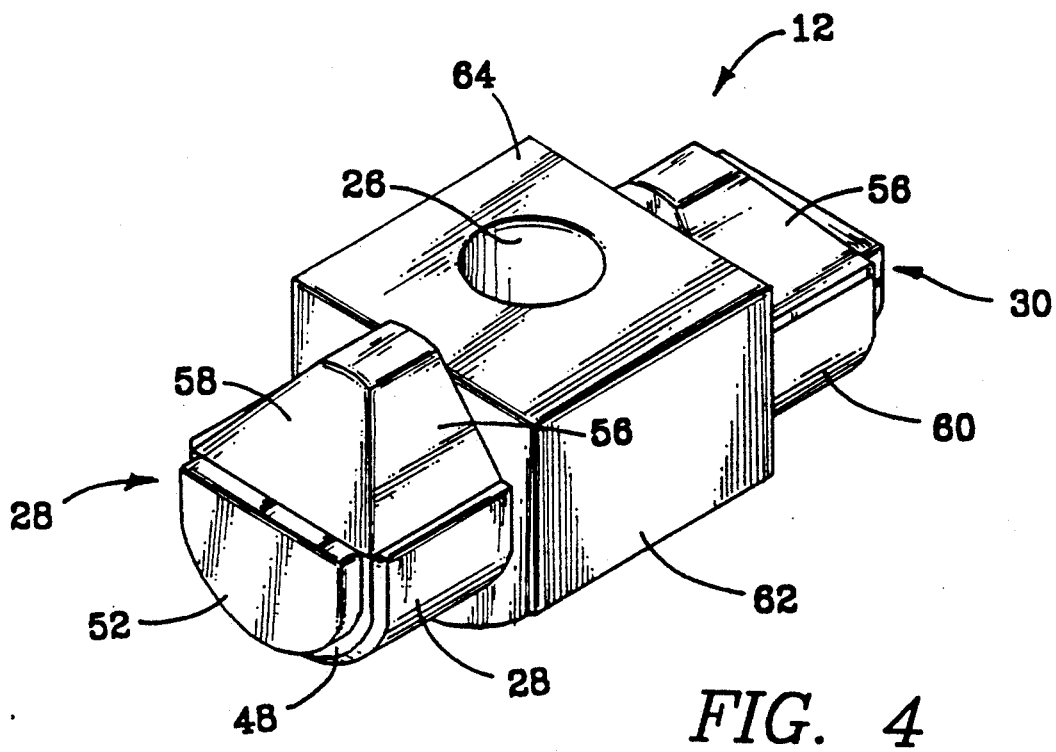
FIG. 4 is a pictorial view of the bearing support member of the rocker arm assembly of FIG. 1.

Bearing support member 12 may include beveled surfaces 56 and 58 and flat side surfaces 60 and 62, as shown in FIG. 4. Those beveled and flat surfaces facilitate manufacture of bearing support member 12 by powder metal forming, as described in U.S. Pat. No. 5,074,261, also co-invented by Applicant. Because rolling members 34 ride on an inner race provided by inner sleeves 32, and because the greatest force is on the lower portion of roller bearings 14, those beveled and flat surfaces on the top and side portions of bearing support member 12 do not affect operation of the rocker arm assembly.

Bearing support member 12 and roller bearings 14 may form a subassembly having a generally cylindrical configuration. Because central portion 64 of support member 12 has a smaller cross-section (smaller overall diameter) than that of bearing cups 36, the subassembly may be inserted laterally into the apertures of the side portions of rocker arm 10 while bearing cups 36 being are press-fit therein. Alternatively, bearing cups 36 may be inserted from opposite sides of rocker arm 10.

From the above, it will be apparent that the present invention provides improved axial stability of the rolling elements. Overhang of rollers with respect to the raceway is prevented, ensuring support along the full effective roller length and improving fatigue life of the rollers. The invention also limits axial movement of the rocker arm with respect to the support shaft without requiring contact of the roller ends with a flange of the bearing sleeve or similar stop surface. In addition, the invention provides a rocker arm subassembly that is easily inserted into a rocker arm and which prevents inadvertent "upside down" assembly.

Having described the invention, what is claimed is:

1. A rocker arm assembly for mounting about a stud means, the assembly comprising:
   a rocker arm having two spaced apart side portions;
   a bearing support member having two support arms extending in opposite directions, the bearing support member being adapted for mounting about the stud means;
   two bearing cups having a common axis, one bearing cup rigidly mounted on each side portion of the rocker arm so as to prevent relative movement between the bearing cup and the rocker arm and extending over part of an arm of the bearing support member, each bearing cup having a stepped bottom surface; and
   rolling members within an annulus formed between the bearing cups and the bearing support member such that the rocker arm is free to oscillate rotatably with respect to the bearing support member;
   the stepped bottom surface having a first bottom portion engageable with ends of the rolling members to limit axial movement of the rolling members and the second bottom portion, offset axially with respect to the first bottom portion, engageable with stop surfaces to limit axial movement of the rocker arm with respect to the support member.

2. The rocker arm assembly according to claim 1, wherein the stop surfaces are end surfaces of the support member.

3. The rocker arm assembly according to claim 1, further comprising two bearing sleeves, one sleeve mounted over each support arm between the rolling members and the bearing support member, providing an inner race for the rolling members.

4. The rocker arm assembly according to claim 3, wherein the stop surfaces are end surfaces of the bearing sleeves corresponding to the ends of the support member.

5. The rocker arm assembly according to claim 3, wherein each of the two bearing sleeves includes a radially inwardly extending flange engageable with the respective end of the support member.

6. The rocker arm assembly according to claim 3, wherein each of the two bearing sleeves includes a radially outwardly extending flange engageable with the rolling members to limit axial movement of the rolling members.

7. The rocker arm assembly according to claim 6, wherein each of he two bearing sleeves includes a radially inwardly extending flange engageable with the respective end of the support member, and wherein the radially inwardly extending flange and the radially outwardly extending flange are on opposite ends of each bearing sleeve.

8. The rocker arm assembly according to claim 1, wherein at least one bearing cup includes keyway means for engaging key means on the respective support arm to limit orientation therebetween.

9. The rocker arm assembly of claim 8, wherein the keyway means comprises a modified D-shaped opening in the bottom surface of at least one of the bearing cups.

10. The rocker arm assembly of claim 1, wherein each side portion of the rocker arm has an opening for receiving the bearing cup mounted thereon and said opening forms an interference fit with the respective bearing cup.

11. The rocker arm assembly of claim 10, wherein the bearing support member is smaller in cross-section than the openings of the side walls such that the bearing support member can be inserted through one of said openings during assembly.

12. The rocker arm assembly of claim 1, wherein each of the side portions of the rocker arm each has an outwardly extending flange forming co-axial cylindrical openings for supporting the respective bearing cup and for enhancing rigidity of the rocker arm.

13. A bearing assembly for mounting within a rocker arm, the assembly comprising:
    a bearing support member having two support arms extending in opposite directions, the bearing support member being adapted for mounting about a stud means;
    two bearing cups, each bearing cup adapted to be rigidly mounted on the rocker arm so as to prevent relative movement between the bearing cup and the rocker arm, one bearing cup extending over part of an arm of the bearing support member, each bearing cup having a stepped bottom surface; and
    rolling members within an annulus formed between the bearing cups and the bearing support member such that the bearing cups are free to oscillate rotatably with respect to the bearing support member;
    the stepped bottom surface having a first bottom portion engageable with ends of the rolling members to limit axial movement of the rolling members to eliminate overhang of the rolling members with respect to a bearing raceway and a second bottom portion, offset axially with respect to the first bottom portion, engageable with stop surfaces to limit axial movement of the bearing cups with respect to the support member.

14. The bearing assembly according to claim 13, wherein the stop surfaces are end surfaces of the support member.

15. The bearing assembly according to claim 13, further comprising two bearing sleeves, one sleeve mounted over each support arm between the rolling members and the bearing support member, providing an inner race for the rolling members.

16. The bearing assembly according to claim 15, wherein the stop surfaces are end surfaces of the bearing sleeves corresponding to the ends of the support member.

17. The bearing assembly according to claim 15, wherein each of the two bearing sleeves includes a radially inwardly extending flange engageable with the respective end of the support member.

18. The bearing assembly according to claim 15, wherein each of the two bearing sleeves includes a radially outwardly extending flange engageable with the rolling members to limit axial movement of the rolling members.

19. The bearing assembly according to claim 18, wherein each of the two bearing sleeves includes a radially inwardly extending flange engageable with the respective end of the support member, and wherein the radially inwardly extending flange and the radially outwardly extending flange are one opposite ends of each bearing sleeve.

20. The rocker arm assembly according to claim 13, wherein at least one bearing cup includes keyway means for engaging key means on the respective support arm to limit orientation therebetween.

21. The rocker arm assembly of claim 20, wherein the keyway means comprises a modified D-shaped opening in the bottom surface of at least one of the bearing cups.

* * * * *